(12) United States Patent
Li et al.

(10) Patent No.: US 11,163,743 B2
(45) Date of Patent: *Nov. 2, 2021

(54) ENHANCEMENTS FOR OPTIMIZING QUERY EXECUTIONS

(71) Applicant: International Business Machines Corporation, Armonk, NY (US)

(72) Inventors: Shuo Li, Beijing (CN); Ping Liang, Beijing (CN); Kewei Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 16/406,049

(22) Filed: May 8, 2019

(65) Prior Publication Data

US 2019/0294601 A1 Sep. 26, 2019

Related U.S. Application Data

(63) Continuation of application No. 15/150,758, filed on May 10, 2016, now Pat. No. 10,331,646, which is a continuation of application No. 14/755,608, filed on Jun. 30, 2015, now Pat. No. 9,996,574.

(51) Int. Cl.
| | |
|---|---|
| *G06F 16/2455* | (2019.01) |
| *G06F 16/22* | (2019.01) |
| *G06F 16/28* | (2019.01) |
| *G06F 16/2453* | (2019.01) |

(52) U.S. Cl.
CPC .... *G06F 16/2282* (2019.01); *G06F 16/24542* (2019.01); *G06F 16/24549* (2019.01); *G06F 16/24558* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 9,679,040 B1 | 6/2017 | Davis | |
| 9,996,574 B2 * | 6/2018 | Li | ........................ G06F 16/2282 |
| 10,321,646 B1 * | 6/2019 | King | .................. C12N 15/8247 |

(Continued)

OTHER PUBLICATIONS

Wu et al., "Partitioning Techniques for Fine-grained Indexing", Proceedings of the 2011 IEEE International Conference on Data Engineering (ICDE), Apr. 11-16, 2011, Hannover, Germany, pp. 1127-1138.

(Continued)

*Primary Examiner* — Wilson Lee
(74) *Attorney, Agent, or Firm* — Edward J. Wixted, III

(57) ABSTRACT

In an approach for optimizing query executions a processor receives a request to transfer data from a first table to a second table. A processor detects a relationship between the first table and the second table, wherein the relationship is based on a similarity between the first table and the second table. A processor identifies at least a first access path for transferring the data from the first table to the second table. A processor calculates a first cost of transferring the data from the first table to the second table using the first access path based on the similarity between the first table and the second table, wherein the first cost indicates estimated processor usage to transfer the data.

9 Claims, 3 Drawing Sheets

(56) References Cited

U.S. PATENT DOCUMENTS

| | | | |
|---|---|---|---|
| 10,331,646 B2* | 6/2019 | Li | G06F 16/24542 |
| 2003/0055677 A1 | 3/2003 | Brown | |
| 2007/0087756 A1 | 4/2007 | Hoffberg | |
| 2008/0031404 A1 | 2/2008 | Khamene | |
| 2008/0059190 A1 | 3/2008 | Chu | |
| 2009/0319645 A1 | 12/2009 | Boldyrev | |
| 2010/0332401 A1 | 12/2010 | Prahlad | |
| 2011/0144903 A1 | 6/2011 | Gupta | |
| 2011/0299766 A1* | 12/2011 | Wexler | G06T 11/001 |
| | | | 382/162 |
| 2013/0080441 A1 | 3/2013 | Aboulnaga | |
| 2013/0196621 A1* | 8/2013 | Guday | H04M 15/85 |
| | | | 455/406 |
| 2013/0198373 A1 | 8/2013 | Zalmanovitch | |
| 2013/0262435 A1 | 10/2013 | Bossman | |
| 2014/0006465 A1 | 1/2014 | Davis | |
| 2014/0007239 A1 | 1/2014 | Sharpe | |
| 2014/0105447 A1* | 4/2014 | Samari | G06F 16/683 |
| | | | 382/100 |
| 2014/0324870 A1 | 10/2014 | Kami | |
| 2016/0255562 A1 | 9/2016 | Sharma | |

OTHER PUBLICATIONS

Li et al., "Enhancements for Optimizing Query Executions", U.S. Appl. No. 15/150,758, filed May 10, 2016, 17 pages.
Li et al., "Enhancements for Optimizing Query Executions", U.S. Appl. No. 16/406,046, filed May 8, 2019, 25 pages.
IBM "List of Patent Applications Treated as Related" Appendix P, Dated May 2, 2019, 2 pages.

* cited by examiner

ENHANCEMENTS FOR OPTIMIZING QUERY EXECUTIONS

BACKGROUND

The present invention relates generally to the field of query executions, and more particularly to enhancing query executions by choosing a more efficient access path.

A query plan (or query execution plan) is an ordered set of steps used to access data in a structured query language (SQL) relational database management system. The query is a specific case of the relational model concept of access paths. Since SQL is declarative, there are typically a large number of alternative ways to execute a given query, with widely varying performance. When a query is submitted to the database, the query optimizer evaluates some of the different, correct possible plans for executing the query and returns what the query optimizer considers the best alternative.

An access path refers to a path chosen by a system to retrieve data after a SQL request is executed. A query may request at least one variable to be filled up with one or more values. Access path selection can have a tremendous impact on the overall performance of the system. A query can be a very simple query with one variable being matched to values from one table only, or a more complex query that may involve looking for many variables which can be matched to many different records on separate tables. Some of these variables even have complex conditions such as greater than or less than some value of integers.

Optimization of access path selection may be gauged using cost formulas with input and output (I/O) and central processing unit (CPU) utilization weight usually considered. Generally, query optimizers evaluate the available paths to data retrieval and estimate the cost in executing the statements using the determined paths or a combination of these paths.

SUMMARY

Aspects of an embodiment of the present invention disclose an approach for optimizing query executions. In one embodiment, a processor receives a request to transfer data from a first table to a second table. In one embodiment, a processor detects a relationship between the first table and the second table, wherein the relationship is based on a similarity between the first table and the second table. In one embodiment, a processor identifies at least a first access path for transferring the data from the first table to the second table. In one embodiment, a processor calculates a first cost of transferring the data from the first table to the second table using the first access path based on the similarity between the first table and the second table, wherein the first cost indicates estimated processor usage to transfer the data.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention discloses an approach to enhancing query executions by choosing a more efficient access path. This invention focuses on a method for path selection in queries based on the processing cost of the each path, which assists database choose a more efficient access path.

The present invention will now be described in detail with reference to the Figures.

Figure 1:
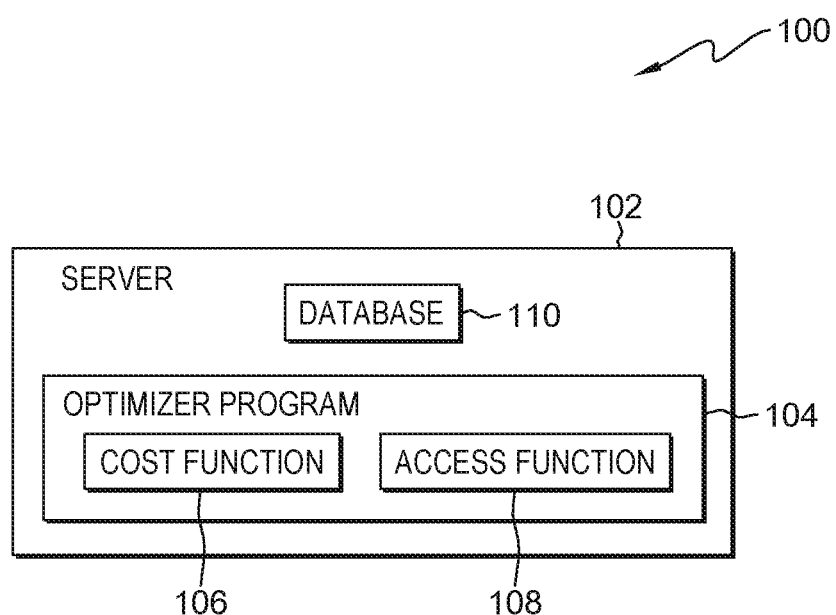
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to and server 102. Computing environment 100 may include additional computing devices, servers, computers, components, or additional devices not shown. It should be appreciated FIG. 1 provides only an illustration of one implementation and does not imply any limitations with regard to the environments in which different embodiments may be implemented. Many modifications to the depicted environment may be made.

Server 102 may be a management server, a web server, or additional electronic device or computing system capable of processing program instructions and receiving and sending data. In other embodiments, server 102 may be a laptop computer, tablet computer, netbook computer, personal computer (PC), desktop computer, or any programmable electronic device. In additional embodiments, server 102 may represent a server computing system utilizing multiple computers as a server system, such as in a cloud computing environment. In another embodiment, server 102 represents a computing system utilizing clustered computers and nodes to act as a single pool of seamless resources. In the depicted embodiment, server 102 includes optimizer program 104 and database 110. In additional embodiments, server 102 may include and additional programs, storage devices, or components. Server 102 may include components, as depicted and described in further detail with respect to FIG. 4.

Optimizer program 104 controls the calculation of different costs associated with the queries, and the selection of the access path associated with each individual query. The query is a request for data from database 110 or another repository. The data the query is working with is in the form of tables. The query performs an action which affects the data in the tables. The query language is a series of actions which, for example, modify the data in the tables, relocate the data in the tables, or add/remove the data from the tables. An example query language is the statement INSERT FROM SELECT query. The INSERT FROM SELECT statement selects data from one table and inserts it into an existing table. The different costs associated with the queries assist in determining the demand from the central processing unit (CPU). In one embodiment, the lower the costs result in less work from the CPU.

Factors which affect the cost include the type of data which is being transferred, the relationship between the tables, and the order of the data. Based on the query statements, data can be selected at random or sequential. Data selected at random typically has a higher CPU cost than data selected in a sequential or logical order. Sequential data can also be divided into segments, or has a specified location within a table. The order of the data is determined by how the data is required to be transferred from the first table to the second table. In other embodiments, the data is required to be transferred from the first table to the second table in a specific order. In other embodiments, data is not required to be transferred from the first table to the second table in a specific or chronological order. Data which is required to be transferred in a specific order results in a higher cost, while data which does not require a specific order for transferring has a lower cost.

The relationship between the INSERT FROM SELECT tables is determined by the connectivity of the tables. The connectivity of the tables is defined by the similarity between the tables. Factors that determine the similarity between the tables can be, for example, table structure, or the data in the table. Examples of aspects of the table structure which affect the similarity between the tables can be the rows, columns, size of the table, and other structural features of the table. Examples of aspects of the data types in the table which affect the similarity between the tables can be, data topics, data complexity, format of the data, or data type. A higher similarity between the data in the tables results in an easier transfer of data between the tables because the CPU has fewer steps to transfer and reorganize the data.

In other embodiments, optimizer program 104, calculates the costs associated with the queries, and the selection of the access path associated between more than two tables. In other embodiments, optimizer program 104 calculates the costs associated with the queries, and the selection of the access path associated between multiple tables in parallel. In other embodiments, optimizer program 104 selects the access path based on the calculation of all of these factors. In other embodiments, optimizer program 104 selects the access path based on the calculation from a selection of factors. In the depicted embodiment, optimizer program 104 includes cost function 106, and access function 108. In another embodiments, cost function 106, and access function 108 may be functions of additional programs, or standalone programs located on server 102 or additional servers, or computing devices, provided cost function 106, and access function 108 are each accessible to optimizer program 104.

Cost function 106 calculates an estimate cost of the SELECT table and the INSERT table. The cost of the SELECT table or the INSERT table is calculated from a list of variables, for example, the type of data or the table connectivity. In one embodiment, cost function 106 divides the estimation calculation into storage hardware device Direct access storage device (DASD) cost estimation, and a CPU cost estimation and merges the two values to create the SELECT table or INSERT table cost. In other embodiments, cost function 106 calculates the DASD cost estimation, for example, can be based on the locating of information, and necessary searching for the information either in a repository or in a cache. In other embodiments, cost function 106 calculates the CPU cost estimation by, for example, dividing the cost estimation into a lock cost, scan cost, reserve cost, concurrency cost, and log cost. These costs are dependent on the type of data, the order of the data, and the table connectivity. A portion of these costs add up to give cost function 106 the CPU cost which is used by access function 108 to determine an efficient and effective access path. In other embodiments, cost function 106 uses these and other factors to calculate the CPU cost. In the depicted embodiment, cost function 106 is a function of optimizer program 104. In another embodiments, cost function 106 may be a standalone program located on server 102, or an additional computing device, provided cost function 106 is accessible to optimizer program 104.

In another embodiment, cost function 106 checks the relationship between the tables to determine the connectivity between the two tables. In one embodiment, the tables are the data provided table, and the destination table. In other embodiments, there are more than two tables where information is gathered from and placed in and cost function 106 determines the connectivity between the tables. In one embodiment, cost function 106 uses a foreign key detection to determine the relationship between the columns and a primary key node (PKN) to determine the relationship of the workload. A PKN is a table that has a special relationship with the table or tables it is joined with. This special relationship allows for an easier transfer of information from one table to the next, resulting in a higher connectivity between the two tables. In another embodiment, cost function 106 detects the connectivity of the tables by detecting the table structure. The table structure as discussed before has many different variables which determine the similarities and consistencies between the two tables.

Access function 108 controls the access path which is to be taken based on the calculations of the cost function 106. The access path is the route which optimizer program 104 uses to transfer data from the data provided table to the destination table. In other embodiments, access function 108 locates more than one access path. In other embodiments, access function locates only one access path. Access function 108 determines if the data provided has an order and based on the order of the data, calculates either a reduction to the cost, or calculates the cost with a sort plan and then selects an access path. Order of the data is related to the connectivity of the tables, and the random or sequential data in the tables. Depending on the order of the data, access function 108 may add a reduction factor into the cost. If a reduction cannot be factored into the cost, access function 108 may use a sort plan factor into the cost. A sort plan is an addition cost factor added on to the CPU cost calculation if the data requires a process which sorts or reorganizes the data prior to transferring the data from the data provided table to the destination table. In other embodiments, access function 108 may add both a reduction factor and incorporate a sort plan as well. In the depicted embodiment, access function 108 is a function of optimizer program 104. In another embodiments, access function 108 may stand alone as a program located on server 102, or an additional computing device, provided access function 108 is accessible to optimizer program 104.

Database 110 may be a repository which may be written to and/or read by optimizer program 104. In one embodiment, database 110 includes, for example, the tables involved in the cost estimation, previous cost estimations, relationships between components or elements, access paths both those used by optimizer program 104 and access paths not used by optimizer program 104, and the selections made by optimizer program 104. In additional embodiments, database 110 may be written to and/or read by optimizer program 104 and/or additional computing devices, servers, computers, components, or additional devices not shown. In one embodiment, database 110 is a database management system (DBMS), used to allow the definition, creation, querying, update, and administration of a database(s). In another embodiment, database 110 is a relationship database management system (RDMS). In the depicted embodiment, database 110 is stored on server 102. In additional embodiments, database 110 may reside on an alternative server, computer, or computing device, provided database 110 is able to communicate with optimizer program 104 and additional devices, programs, and components (not shown).

Figure 2:
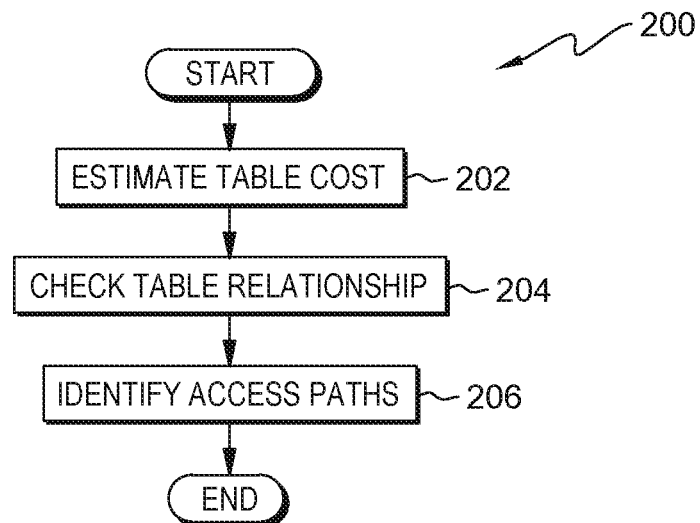
FIG. 2 depicts a flowchart of the operational steps taken by optimizer program to calculate the cost for the access paths, within computing environment 100 of FIG. 1, in accordance with an embodiment of the present invention.

FIG. 2 depicts a flowchart of the operational steps taken by optimizer program to calculate the cost for the access paths, within computing environment 100 of FIG. 1, in accordance with an embodiment of the present invention. Flowchart 200 depicts the steps taken by cost function 106 to estimate the cost for the access path. It should be appreciated FIG. 2 provides only an illustration of one implementation and does not imply any limitations with regard to the environments in which different embodiments may be implemented. Many modifications to the depicted environment may be made.

In step 202, cost function 106 estimates the tables' cost. Cost function 106 estimates the cost associated with transferring data in the INSERT FROM SELECT query statement. The cost associated with transferring data correlates to work performed by the CPU. A lower cost is associated with less work being performed by the CPU resulting in a faster transfer of data between the tables. A higher cost is associated with more work needed to be performed by the CPU resulting in a slower, or longer transfer of data between the tables. A higher cost results in the CPU having to use more processing power to complete the transfer. A higher cost can also result in a larger time period to complete the transfer. In one embodiment, cost function 106 estimates the cost in an INSERT FROM SELECT query. In this embodiment, cost function 106 estimates the cost of an INSERT table and a SELECT table.

In one embodiment, cost function 106 calculates the table cost from the data type. In other embodiments, cost function 106 calculates the cost of specific tables. In other embodiments, cost function 106 calculates the table cost, using the data type or other factors used to estimate the CPU demand. In other embodiments, cost function 106 calculates the cost a single time. In other embodiments, cost function 106 calculates the cost multiple times and an average cost is calculated. The average cost is used as the estimate cost for the tables involved. In other embodiments, cost function 106 calculates the estimate cost for the table a predetermined number of times, set by a third party or optimizer program 104. In other embodiments, cost function 106 gathers an estimate cost for the table from a repository if the data type, data order, connectivity between the tables, or other factors used to estimate the CPU demand for the SELECT table of the query are within a predetermined threshold to a prior cost estimation. This prior cost value is then used in place of a calculated cost value. In other embodiments, cost function 106 incorporates multipliers in the calculation. Examples of multipliers which are incorporated into the calculation can be, for example if the data is sequential or segmented, if the data is concurrent, or if there is a necessity for a query log. In one embodiment, cost function 106 stores the SELECT table cost in a repository for future use.

In step 204, cost function 106 compares the relationship between the tables. Cost function 106 checks the relationship between the tables. This relationship assists in determining if the insert is sequential or random. The relationship between the tables is the connectivity or similarity of the tables. In another embodiment, cost function 106 checks the relationship between the tables using a foreign key detection to determine the relationship between the columns and a primary key node (PKN) to determine the relationship of the workload. A foreign key is a constraint used to prevent actions that would destroy links within and between tables, or the foreign key is a constraint which prevents invalid data from being inserted into a foreign key column established in a table. A PKN is a table that has a special relationship with the table or tables it is joined with. This special relationship allows for an easier transfer of information from one table to the next, resulting in a higher connectivity between the two tables. In another embodiment, cost function 106 detects the connectivity of the tables by detecting the table structure. In one embodiment, cost function 106 gathers the relationship between the two tables from a repository. In another embodiment, cost function 106 stores the calculated relationship between the tables in a repository.

In step 206, cost function 106 identifies the access paths. Once cost function 106 calculates the cost for the tables, cost function 106 identifies access paths. An access path is the route which optimizer program 104 implements to complete the query. In one embodiment, cost function 106 identifies a single access path. In one embodiment, cost function 106 identifies a plurality of access paths. In one embodiment, cost function 106 identifies a plurality of access paths within a predetermined threshold, or exceeds a predetermined threshold for speed and efficiency. In some embodiment, cost function 106 identifies a plurality of access paths and sorts the access paths in terms of speed. In other embodiments, cost function 106 identifies a prior access path stored in a repository. In another embodiment, cost function 106 stores the identified access paths in a repository for future use.

Figure 3:
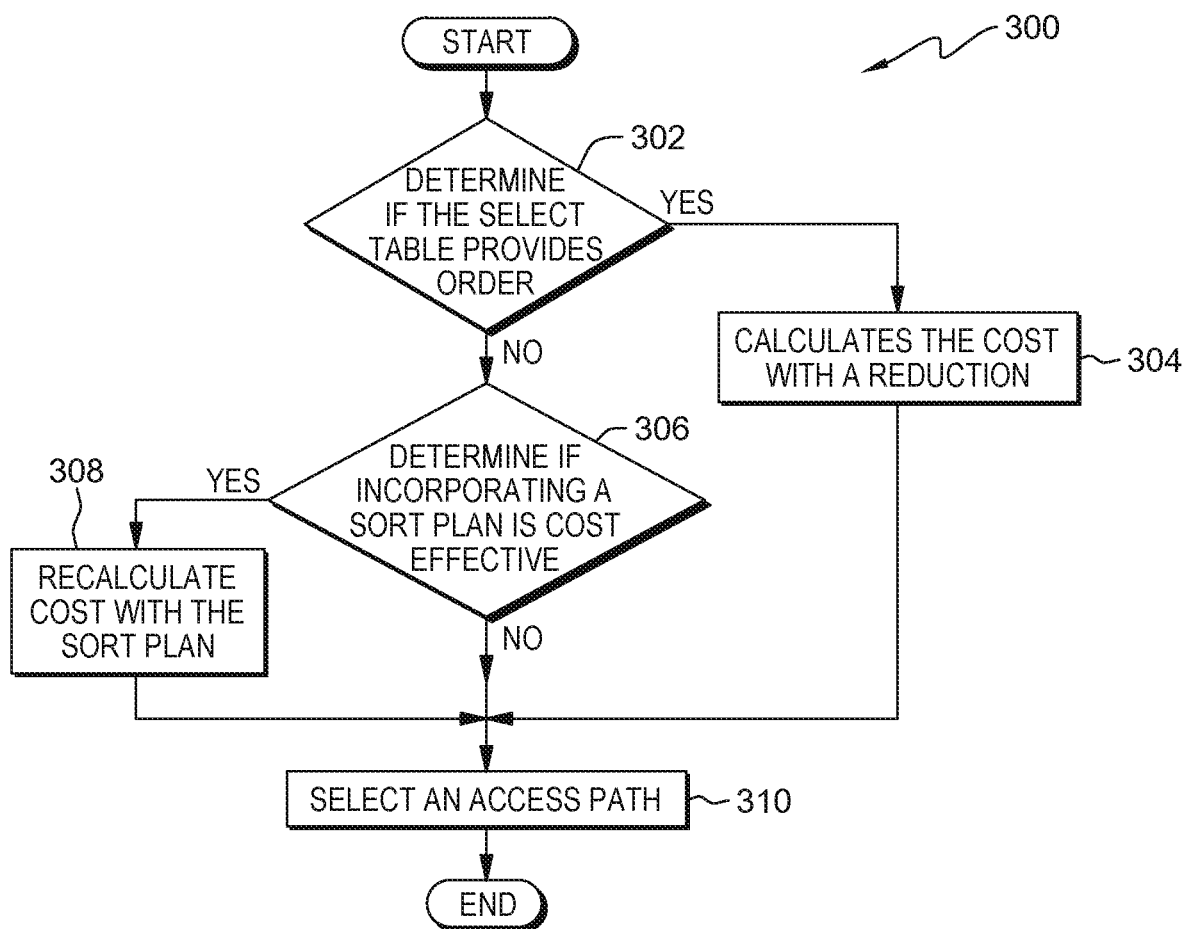
FIG. 3 depicts a flowchart of the operational steps taken by optimizer program to select an access path, within computing environment 100 of FIG. 1, in accordance with an embodiment of the present invention.

FIG. 3 depicts a flowchart of the operational steps taken by optimizer program to select an access path, within computing environment 100 of FIG. 1, in accordance with an embodiment of the present invention. Flowchart 300 depicts the selection of the access path. It should be appreciated FIG. 3 provides only an illustration of one implementation and does not imply any limitations with regard to the environments in which different embodiments may be implemented. Many modifications to the depicted environment may be made.

In decision 302, access function 108 determines if the SELECT table provides order. The order of the table is how the data needs to be transferred from between tables. The order can be, for example, chronological, based on a hierarchy of information within the table, or determined by a foreign key restriction. The order is relevant to determine the cost of the process and if reductions or additions are factored into the cost. If access function 108 determines the SELECT table provides order and cannot be performed randomly (Yes branch, proceed to step 304), access function 108 factors a reduction into the cost. If access function 108 determines the SELECT table does not provides order (No branch, proceed to step 306), access function 108 factors an addition into the cost.

In step 304, access function 108 calculates the cost with a reduction. The reduction is helpful is decreasing the cost of the operation and increasing the number of potential access paths which can be used to transfer the data between the tables. In other embodiments, access function 108 factors the reduction into the INSERT cost. In other embodiments, access function 108 factors the reduction into the SELECT cost. In other embodiments, access function 108 subtracts the reduction factor from the total cost of the operation. In other embodiments, access function 108 calculates the cost with a predetermined reduction calculated into the cost. In other embodiments, access function 108 calculates the cost with a variable reduction calculated into the cost. The variable reduction can be based on, for example, the amount of data, the order provided, and other factors which potentially affect the cost.

In decision 306, access function 108 determines if adding a sort plan is cost effective. The sort factor is a factor which is incorporated into the overall cost. The sort plan is a process which adjusts the data in the INSERT table if the INSERT table does not provide an order. The sort plan allows for faster transfer of information because the data is sorted to be more easily transferred. If the cost with the sort plan is less than the cost without the sort plan (YES branch, proceed to step 308), access function 108 adds the sort plan into the cost calculation. If the cost with the sort plan is greater than the cost without the sort plan (NO branch, proceed to 310), access function 108 does not add the sort plan into the cost calculation. In some embodiments, the sort plan cost alteration is calculated into the INSERT table cost. If the sort plan cost is calculated into the INSERT table cost, cost function 106 reorganizes the data to allow for fast transfer of information from the INSERT table to the SELECT table. In other embodiments, access function 108 calculates a sort factor as predetermined value. In other embodiments, access function 108 calculates the sort factor dependent on the INSERT table and the SELECT table order, size, connectivity, and other factors.

In one embodiment, access function 108 calculates a cost without the sort factor, and also calculates a cost with the sort value and compares the two total costs. In some instances the total cost with the sort factor may be less than the total cost without the sort factor, in which case access function 108 select the total cost with the sort factor. The sort factor can also be factored into the total cost even if the SELECT table provides and order to further lower the cost of the operation.

In step 308, access function 108 recalculates the cost with the sort plan. Access function 108 recalculates the cost with the sort plan factored into the cost. In one embodiments, the sort plan cost is factored into the INSERT table cost. In other embodiments, the sort plan cost is added to the cost of the INSERT table cost and SELECT table cost. In yet another embodiment, the sort plan cost is factored into the INSERT table cost, and is added to the INSERT table cost and the SELECT table cost.

In step 310, access function 108 selects an access path. Access function 108 selects the access path to transfer the data from INSERT table to SELECT table. The path which access function 108 selects is based on the cost calculated and the availability of the CPU. A lower cost calculated results in a lower CPU demand and thus a greater number of potential access paths for access function 108 to transfer the data between INSERT table and SELECT table. If the cost calculated is higher there is a greater demand on the CPU which results in a lower number of potential access paths to select from. Access function 108 selects the access path to allow for an effective and efficient transfer of data. This may be the fastest access path but does not necessarily have to be. For example access function 108 may wait to select an access path because the calculated cost is greater than the cost of the available access paths. Access function 108 waits for an access path which can handle the CPU demand to become available. In other embodiments, access function 108 selects and access path which has a cost that is equal to or greater than a predetermined threshold value. In other embodiments, access function 108 stores this information in a repository for future use.

Figure 4:
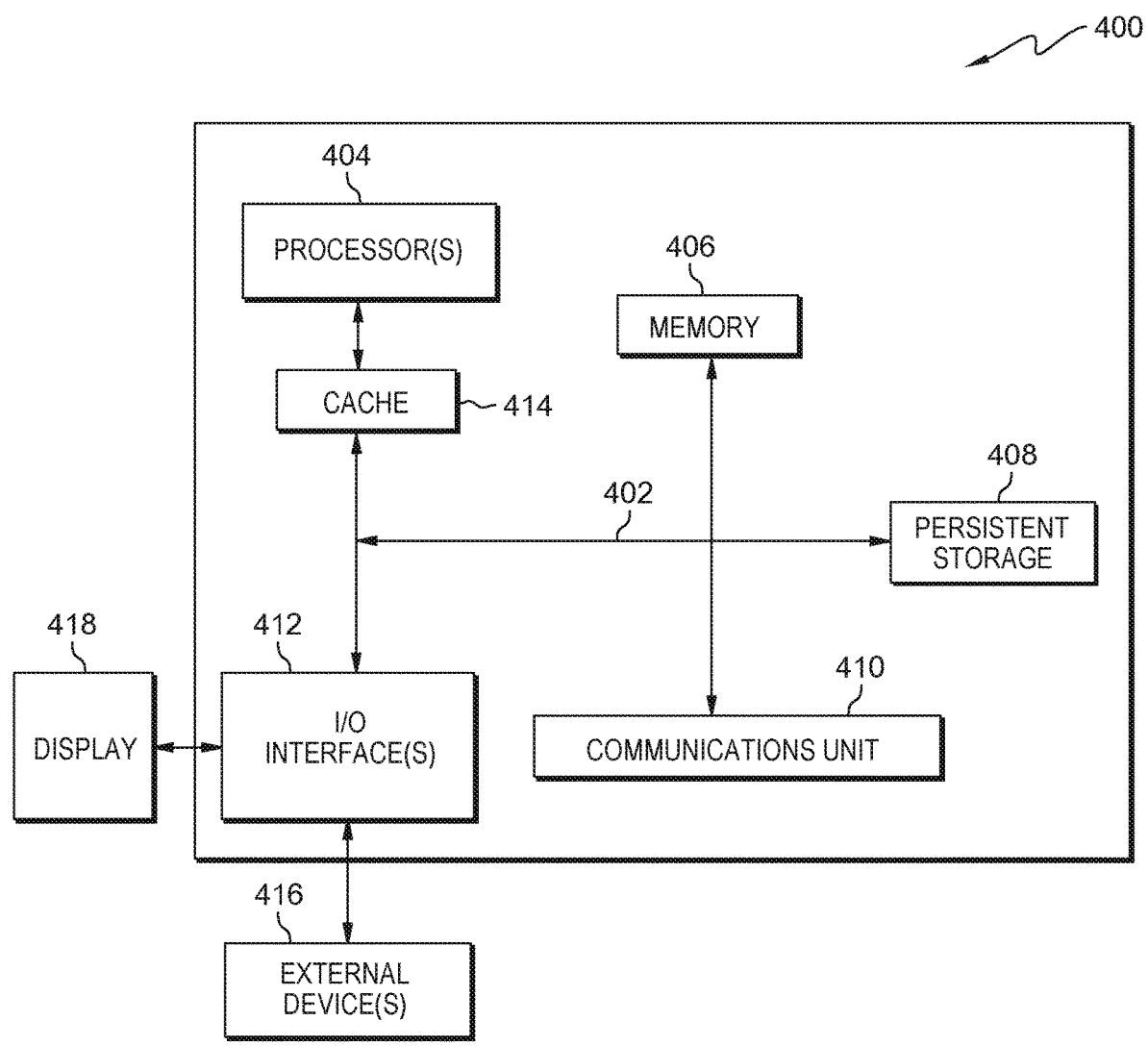
FIG. 4 depicts a block diagram depicting the internal and external components of the server of FIG. 1, in accordance with one embodiment of the present invention.

FIG. 4 depicts a block diagram 400 of components of server 102, in accordance with an illustrative embodiment of the present invention. It should be appreciated FIG. 4 provides only an illustration of one implementation and does not imply any limitations with regard to the environments in which different embodiments may be implemented. Many modifications to the depicted environment may be made.

Server 102 includes communications fabric 402, which provides communications between computer processor(s) 404, memory 406, persistent storage 408, communications unit 410, and input/output (I/O) interface(s) 412. Communications fabric 402 may be implemented with any architecture designed for passing data and/or control information between processors (such as microprocessors, communications and network processors, etc.), system memory, peripheral devices, and any additional hardware components within a system. For example, communications fabric 402 may be implemented with one or more buses.

Memory 406 and persistent storage 408 are computer-readable storage media. In one embodiment, memory 406 includes random access memory (RAM) and cache memory 414. In general, memory 406 can include any suitable volatile or non-volatile computer-readable storage media.

Memory 406 is stored for execution by one or more of the respective computer processors 404 of server 102 via one or more memories of memory 406 of server 102. In the depicted embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any additional computer-readable storage media that is capable of storing program instructions or digital information.

The media used by persistent storage 408 may also be removable. For example, a removable hard drive may be used for persistent storage 408. Additional examples include optical and magnetic disks, thumb drives, and smart cards that are inserted into a drive for transfer onto another computer-readable storage medium that is also part of persistent storage 408.

Communications unit 410, in the examples, provides for communications with additional data processing systems or devices, including server 102. In the examples, communications unit 410 includes one or more network interface cards. Communications unit 410 may provide communications through the use of either or both physical and wireless communications links.

I/O interface(s) 412 allows for input and output of data with additional devices that may be connected to server 102. For example, I/O interface 412 may provide a connection to external devices 416 such as a keyboard, keypad, camera, a touch screen, and/or some additional suitable input device. External devices 416 can also include portable computer-readable storage media such as, for example, thumb drives, portable optical or magnetic disks, and memory cards.

Software and data used to practice embodiments of the present invention, e.g., optimizer program 104, cost function 106, and access function 108 can each be stored on such portable computer-readable storage media and can be loaded onto persistent storage 408 of server 102 via I/O interface(s) 412 of server 102. I/O interface(s) 412 also connect to a display 418.

Display 418 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In other embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for optimizing query executions, the computer program product comprising:
one or more computer readable hardware storage media and program instructions stored on the one or more computer readable hardware storage media, the program instructions comprising:
program instructions to receive a request to transfer data from a first table to a second table;
program instructions to detect a relationship between the first table and the second table, wherein the relationship is based on a similarity between the first table and the second table;
program instructions to identify at least a first access path for transferring the data from the first table to the second table;
program instructions to calculate a first cost of transferring the data from the first table to the second table using the first access path based on the similarity between the first table and the second table, wherein the first cost indicates estimated processor usage to transfer the data; and
program instructions to select the first access path to transfer the data from the first table to the second table.

2. The computer program product of claim 1, further comprising:
program instructions to determine the first table provides an order corresponding to the second table;
program instructions to calculate a first reduction based on the first table providing an order corresponding to the second table; and
program instructions to adjust the first cost by first reduction.

3. The computer program product of claim 1, further comprising:
program instructions to determine the first table does not provide an order corresponding to the second table;
program instructions to calculate a factor, based on the similarity between the first table and the second table and the determination that the first table does not provide an order corresponding to the second table, wherein the factor indicates a cost to reorganize the first table such that the data can be transferred to the second table; and
program instructions to calculate a second cost, wherein the second cost is the first cost adjusted by the second factor.

4. The computer program product of claim 1, wherein detecting the relationship between the first table and the second table, further comprises:
program instructions to match a data structure of the first table to a data structure of the second table; and
program instructions to compare contents of the first table to contents the second table.

5. The computer program product of claim 1, further comprising:
program instructions to determine that the first cost exceeds a predetermined threshold;
program instructions to identify a second access path for transferring the data from the first table to the second table, wherein the second access path is currently inaccessible;
program instructions to calculate a second cost of transferring the data from the first table to the second table using the second access path based on the similarity between the first table and the second table, wherein the second cost indicates estimated processor usage to transfer the data;
program instructions to determine that the second cost is within the predetermined threshold;
program instructions to monitor the second access path to determine availability of the second access path;
program instructions to determine that the second access path is available; and
responsive to determining that the second access path is available, program instructions to select the second access path to transfer the data from the first table to the second table.

6. A computer system for optimizing query executions, the computer program product comprising:
one or more computer processors, one or more computer readable hardware storage media, and program instructions stored on the one or more computer readable hardware storage media for execution by, at least one of the one or more computer processors, the program instructions comprising:
program instructions to receive a request to transfer data from a first table to a second table;
program instructions to detect a relationship between the first table and the second table, wherein the relationship is based on a similarity between the first table and the second table;
program instructions to identify at least a first access path for transferring the data from the first table to the second table;
program instructions to calculate a first cost of transferring the data from the first table to the second table using the first access path based on the similarity between the first table and the second table, wherein the first cost indicates estimated processor usage to transfer the data; and
program instructions to select the first access path to transfer the data from the first table to the second table.

7. The computer system of claim 6, further comprising:
program instructions, stored on the computer readable hardware storage media for execution by at least one of the one or more computer processors, to determine the first table provides an order corresponding to the second table;
program instructions, stored on the computer readable hardware storage media for execution by at least one of the one or more computer processors, to calculate a first reduction based on the first table providing an order corresponding to the second table; and
program instructions, stored on the computer readable hardware storage media for execution by at least one of the one or more processors, to adjust the first cost by first reduction.

8. The computer system of claim 6, further comprising:
program instructions, stored on the computer readable hardware storage media for execution by at least one of the one or more computer processors, to determine the first table does not provide an order corresponding to the second table;
program instructions, stored on the computer readable hardware storage media for execution by at least one of the one or more computer processors, to calculate a factor, based on the similarity between the first table and the second table and the determination that the first table does not provide an order corresponding to the second table, wherein the factor indicates a cost to reorganize the first table such that the data can be transferred to the second table; and program instructions, stored on the computer readable hardware storage media for execution by at least one of the one or more computer processors, to calculate a second cost, wherein the second cost is the first cost adjusted by the second factor.

9. The computer system of claim 6, wherein detecting the relationship between the first table and the second table, further comprises:

program instructions, stored on the computer readable hardware storage media for execution by at least one of the one or more computer processors, to match a data structure of the first table to a data structure of the second table; and program instructions, stored on the computer readable hardware storage media for execution by at least one of the one or more computer processors, to compare contents of the first table to contents the second table.

\* \* \* \* \*